United States Patent [19]

Ravipati et al.

[11] Patent Number: 5,739,990
[45] Date of Patent: Apr. 14, 1998

[54] SPIN-VALVE GMR SENSOR WITH INBOUND EXCHANGE STABILIZATION

[75] Inventors: Durga P. Ravipati, Saratoga; Samuel W. Yuan, San Francisco, both of Calif.

[73] Assignee: Read-Rite Corporation, Milpitas, Calif.

[21] Appl. No.: 748,063

[22] Filed: Nov. 13, 1996

[51] Int. Cl.$^6$ .................................................. G11B 5/39
[52] U.S. Cl. .................................................. 360/113
[58] Field of Search .......................... 360/113; 324/252; 338/32 R

[56] References Cited

U.S. PATENT DOCUMENTS

| | | | |
|---|---|---|---|
| 4,639,806 | 1/1987 | Kira et al. | 360/113 |
| 5,018,037 | 5/1991 | Krounbi et al. | 360/113 |
| 5,438,470 | 8/1995 | Ravipati et al. | 360/113 |
| 5,483,402 | 1/1996 | Batra | 360/113 |
| 5,493,467 | 2/1996 | Cain et al. | 360/113 |
| 5,508,866 | 4/1996 | Gill et al. | 360/113 |
| 5,510,941 | 4/1996 | Ohyama et al. | 360/113 |
| 5,528,440 | 6/1996 | Fontana et al. | 360/113 |
| 5,568,335 | 10/1996 | Fontana et al. | 360/113 |
| 5,583,725 | 12/1996 | Coffey et al. | 360/113 |
| 5,608,593 | 3/1997 | Kim et al. | 360/113 |

*Primary Examiner*—Jefferson Evans
*Attorney, Agent, or Firm*—Nathan N. Kallman

[57] ABSTRACT

A magnetoresistive spin valve giant magnetoresistive (GMR) transducer includes a magnetoresistive (MR)/GMR multi-layer with end portions spaced by a central active portion. A pair of electrical lead layers conducts electrical bias current to the transducer. Each electrical lead layer forms abutting junctions in contact with respective end portion of the MR/GMR layers. The longitudinal bias for the MR/GMR layers is provided by a pair of magnetic bias layers. Each magnetic bias layer is disposed in contact with a respective end portion of the MR/GMR layers. Bias current flows into the MR/GMR layers directly through the abutting junctions, allowing the magnetic bias to assume a different bias path through the end portions of the MR/GMR layers. The MR/GMR transducer allows both the electrical and magnetic biases to be optimally designed, without any constraint of one restricting the other, as the two biases often pose conflicting requirements. In addition, the direct electrical current path provides lower electrical resistance and heat dissipation which are of substantial benefit to the performance and reliability of the transducer.

17 Claims, 6 Drawing Sheets

SPIN-VALVE GMR SENSOR WITH INBOUND EXCHANGE STABILIZATION

FIELD OF THE INVENTION

This invention relates to magnetic sensors and in particular to spin-valve or giant magnetoresistive (GMR) transducers characterized by inbound exchange stabilization.

BACKGROUND OF THE INVENTION

Presently known magnetic heads or transducers incorporate magnetoresistive (MR) sensors for detecting magnetically recorded data. A magnetoresistive transducer can read information on a recording medium with much narrower track widths and yields better signal-to-noise ratio. Also, the output signal generated during the data reading process is independent of the traveling speed of the recording medium.

A typical magnetoresistive head includes a magnetoresistive sensor located between two magnetic shield layers. Disposed between the magnetoresistive sensor and the magnetic shield layers are insulating layers. During the data reading mode, the magnetic shields shunt away stray fields, thereby confining the magnetic flux that emanates from a recording medium and which is sensed by the MR sensor. The changes in magnetic flux correspondingly vary the resistivity of the magnetoresistive sensor. A direct electric current passing through the magnetoresistive sensor generates a varying voltage which represents the data stored in the recording medium.

FIG. 1 is a cross-sectional view of a prior art anisotropic magnetoresistive (AMR) transducer taken along a plane parallel to the air bearing surface (ABS) of the device. The transducer 2 comprises a tri-layer structure 4 which includes a spacer layer 8 sandwiched between a magnetoresistive (MR) layer 6 and a soft adjacent layer (SAL) 10. The magnetoresistive layer 6 is typically made of a ferromagnetic material which varies in resistivity in response to magnetic flux changes. As is well-known in the art, to suppress Barkhausen noise, the MR layer 6 must be aligned in a single-domain state. Hard magnetic layers 12 and 14 disposed in contact with the end portions of the MR layer 6 fulfill this function by providing a longitudinal magnetic bias for magnetic domain alignment. Above the hard magnetic layers 12 and 14 are the respective electrical leads 16 and 18.

During the data reading process, a bias current is applied to the transducer through the electrical leads 16 and 18. Changes in magnetic flux intercepted by the transducer 2 vary the electrical resistivity of the MR layer 6. The bias current flowing through the MR layer 6 with varying resistivity accordingly generates a varying voltage. The varying voltage corresponds to the information read out from a storage medium (not shown). Transducers of this type can be found in U.S. Pat. No. 4,639,806, entitled "Thin Film Magnetic Head Having a Magnetized Ferromagnetic Film on the MR Element"

To provide a transducer structure with more continuous longitudinal bias and better planarization, a different type of AMR transducer has been proposed. FIG. 2 shows such a transducer 20 having hard-magnetic layers 22 and 24 form abutting contacts with the MR layer 6 through abutting junctions 26 and 28, respectively. As arranged, hard-magnetic layers 22 and 24 provide a longitudinal magnetic bias to the MR layer 6 with improved continuity, in comparison with the transducer 2 shown in FIG. 1. It also should be noted that the thickness $t_h$ of hard magnetic layers 22 and 24 are comparable in dimension with the corresponding thickness $t_s$ of the trilayer structure 4'. As a consequence, the transducer 20 also realizes another important advantage, namely, an improved step coverage for the overlying magnetic shield and the dielectric layer (not shown). That is, the aforementioned overlying layers can be deposited with less steep steps, thereby minimizing the chance of generating electrical shorts between the electrical leads 16 and 18 and the upper magnetic shield layer (not shown). The transducer 20 operates in a substantially similar manner as the transducer 2 and is not further elaborated herein. Transducers of this type are described in U.S. Pat. No. 5,018,037, entitled "Magnetoresistive Read Transducer Having Hard Magnetic Bias".

A major disadvantage associated with the transducer 20 is that the lateral dimension L, defined as the longest dimension extended by any of the layers in the trilayer structure 4', cannot be further reduced because of the inherent restraint imposed by the design. Specifically, for electrical reliability, each of the hard magnetic layers 22 and 24 needs to be long and preferably with a long junction interface 26 or 28 with the MR layer 6. A long junction interface 26 or 28 reduces the probability of an open contact, allows less current crowding and lowers the overall resistance of the electrical path. However, for magnetic performance, each of the hard magnetic layers 22 and 24 is preferably short with a short interface with the MR layer 8. A short junction interface 26 or 28 reduces the chance of magnetic discontinuity and of sustaining multiple domain states. In actual applications, a middle ground is always chosen between the two sets of conflicting requirements. Accordingly, the transducer 20 is not designed for optimal performance.

To address the aforementioned problem, an improved transducer is disclosed in U.S. Pat. No. 5,438,470, entitled "Magnetoresistive Structure with Contiguous Junction Hard Bias Design with Low Lead Resistance", Ravipati et al., issued Aug. 1, 1995, assigned to the same assignee of the instant invention. The entirety of U.S. Pat. No. 5,438,470 is incorporated herein by reference. As shown in FIG. 3, in the transducer 30, the electrical leads 32 and 34 extend to overlay the end portions of the MR layer 6. The arrangement of the transducer 30 enables the bias current and the longitudinal magnetic bias to assume separate travelling paths 36 and 38, respectively. In essence, the conflicting requirements of sharing the same path for electrical and magnetic considerations are eliminated. Accordingly, the transducer 30 can be designed with a narrow lateral width L capable of interacting recording media with ultra fine data tracks.

The above described transducers are AMR transducers in which the resistivity of the MR layer 6 varies with the square of the cosine of the angle between the bias current and the magnetization direction in the MR layer 6. Recently, a new type of thin film transducer has been described in which change of resistivity of the MR layer is independent of the direction of the bias current flow. Instead, the resistivity linearly changes with respect to the cosine of the angle between the magnetization directions of two separate MR layers within the transducer. Transducers of this type are called giant magnetoresistive (GMR) transducers, or spin valves. Typical spin valve material has a larger incremental resistivity change ($\delta R/R$) and is therefore highly sensitive to magnetic flux changes. Because of the linear cosine relationship, the dynamic range of a spin valve head is also significantly increased, compared to an AMR head. For this reason, spin valves are normally used in higher areal density applications involving narrow data track widths. Layer thicknesses of a GMR transducer are at least a factor of 10 thinner than the AMR counterparts. The extra thin layers of a GMR transducer pose complications in both electrical and magnetic biasing of the transducer. With the thinner main magnetic bias layers, the hard magnetic bias layers, such as layers 12 and 14 (FIG. 1), 22 and 24 (FIG. 2), and 37 and 39 (FIG. 3) all have to be thinly deposited to avoid any problems of step coverage for the overlying layers. However, with layer thicknesses shrunk down in scale, areas for the junction interfaces, such as the electrical lead to magnetic bias layer interfaces 40 and 42 (FIG. 2), and the magnetic bias layer to MR layer interfaces 26 and 28 (FIG. 2), also are reduced in size. These junction interfaces 40, 42, 26 and 28 are direct paths of electrical current. As a consequence, resistivity contributed by the residual impurity at the interfaces of the junctions become more significant. With reference to FIG. 2, electrical current from the electrical lead layer 16 not only has to pass through the junction interface 26 but also has to go through the other junction interface 40. Likewise, when the current reaches the lead layer 18, it also has to pass through the corresponding junction interfaces 28 and 42. As mentioned in the referenced U.S. Pat. No. 5,438,470, the various junction interfaces very often are affixed with residual oxides left over from the fabrication process. These residual junction oxides do not affect very much the magnetic flux of the longitudinal magnetic bias, but are detrimental to passage of the bias current flowing from the lead 16 to the lead 18. That is, with the geometries of the interface junctions reduced in scale, the effect of the oxide residues impeding the current flow becomes more significant.

Localized heating caused by the bias current is also of main concern in the design of any transducer in conjunction with the reduction in size of the various layers. Excessive Joule heat within a confined space is undesirable in several aspects. First, the various layers and their surrounding insulating dielectric have different coefficients of thermal expansion. Constant expansion and contraction caused by localized heating create thermal stress in the various layers. The thermal stress can disrupt the single domain state in the MR layer 6, which the hard magnetic layers 22 and 24 attempt to maintain. Secondly, the straining effect of the thermal mismatches among the various materials may physically deform the delicate layers and consequently cause reliability problems.

There is yet another problem associated with the aforementioned prior art transducers which becomes more significant when the layers of the transducer are scaled down in size. The longitudinal magnetic bias layers, such as layers 22 and 24 (FIG. 2), are formed of material with low permeability and high coercive force. The material normally used includes an alloy of cobalt, chromium and platinum (CoCrPt), which behaves similarly to a permanent magnet with a sizable magnetic moment. The material is commonly called hard magnetic material. When the material is used as bias layers in a transducer, fringing flux lines from the bias layers very often extend beyond the layer intended to be biased. FIG. 4 is a top plan view of a conventional thin film MR transducer in which the fringing magnetic flux lines, designated by the reference numeral 29, emanate from the first hard bias layer 22 to the second hard bias layer 24 with the main field lines 31. The fringing flux lines 29 considerably erode the sensitivity of a read transducer and severely restrict the transducer's ability to read data tracks of high linear recording density.

SUMMARY OF THE INVENTION

It is an object of the invention to provide an MR transducer having an improved electrical bias with low resistivity.

It is another object of the invention to provide a MR transducer having a well defined magnetic bias which allows the transducer to interact with recording media having narrow data tracks and high recording density.

It is yet another object of the invention to provide a MR transducer with high reliability with no significant increase in production cost.

According to this invention a transducer includes an MR layer with end portions spaced by a central active portion. A pair of electrical lead layers conduct electrical bias current into the transducer. Each electrical lead layer forms abutting contact respectively with one of the end portions of the magnetoresistive layer. The longitudinal bias for the magnetoresistive layer is provided by a pair of magnetic bias layers. Each magnetic bias layer is disposed in contact with one of the end portions of the magnetoresistive layer. Bias current flows into the magnetoresistive layer directly through the abutting junctions and assumes its own electrical path. At the same time, it allows the magnetic bias to assume a different bias path through the end portions of the magnetoresistive layer. The magnetoresistive transducer of this invention is optimally designed for both electrical and magnetic bias concerns without any constraint of one restricting the other. In addition, the direct electrical current path provides lower electrical resistance and heat dissipation which substantially benefit the performance and reliability of the transducer.

In one embodiment, the transducer is built as a GMR transducer specifically designed for use in applications involving narrow data track widths and dense linear recording density. In another embodiment, the transducer is built as an AMR transducer.

BRIEF DESCRIPTION OF THE DRAWINGS

The invention will be described in detail with reference to the drawings in which.

Like reference numerals refer to like parts.

DETAILED DESCRIPTION OF THE INVENTION

Figure 5:
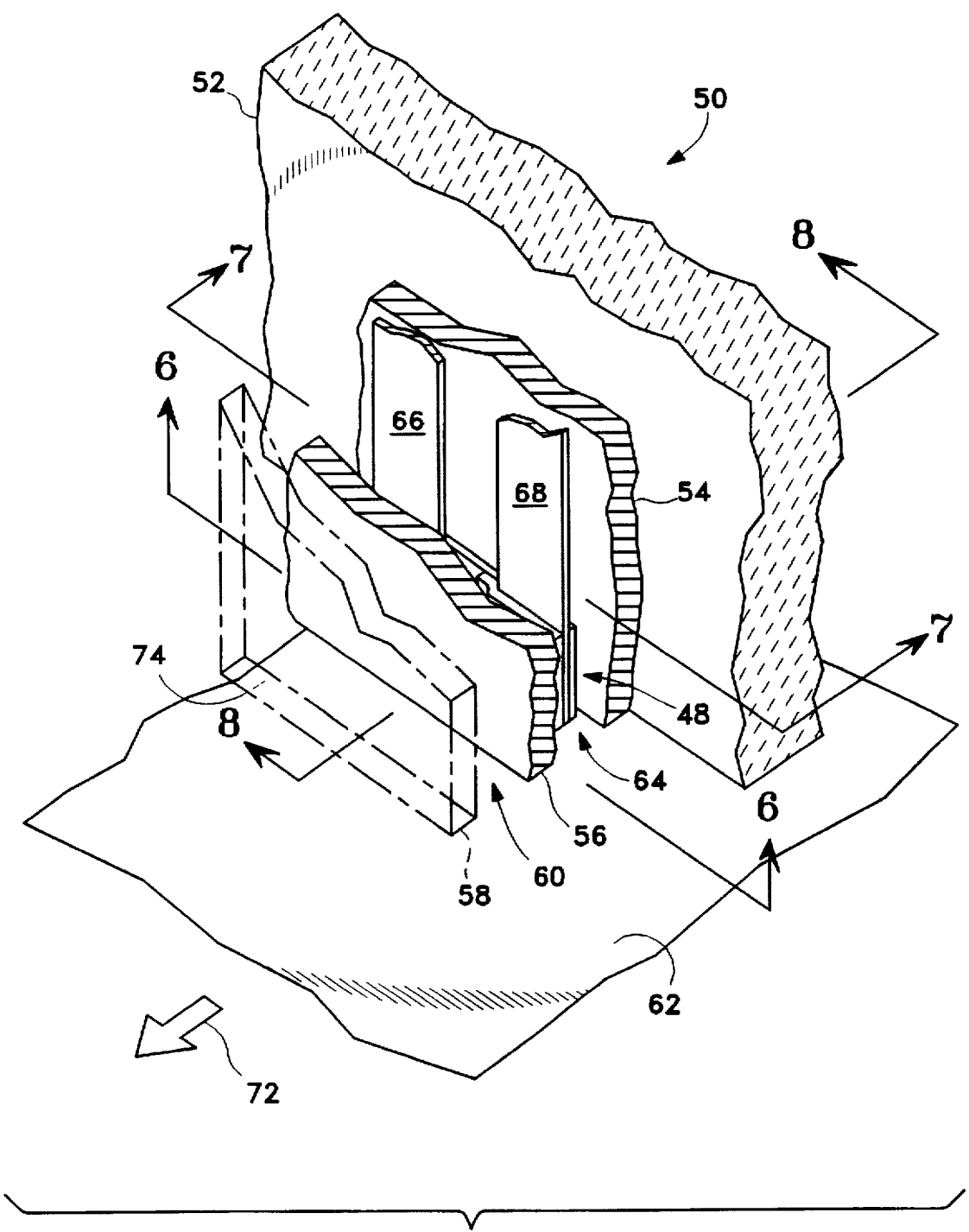
FIG. 5 is schematic perspective view partly broken away of the preferred embodiment of the invention.

With reference to FIG. 5, a transducer 48 is shown as part of a magnetic head 50 formed on a substrate 52 made of nonmagnetic and electrically non-conducting material, such as silicon carbide (SiC). For the sake of clarity, the various insulating and protective layers of the magnetic head 50 are not shown thus exposing the relevant components of the transducer 48. Disposed above the substrate 52 are first and second magnetic shields 54 and 56, and a pole 58 which confine magnetic flux in a controllable manner. For example, between the pole 58 and the shield 56 is a write gap 60 in which magnetic flux originating from a write coil (not shown) passes to a recording medium 62 during the data writing mode. Between shields 54 and 56 is a read gap 64 in which magnetic flux emanating from the recording medium 62 is sensed during the data reading mode. The magnetic pole 58 and shields 54 and 56 are preferably made of a soft magnetic material having a low coercive force and a high permeability, such as an alloy comprising nickel and iron (NiFe). There are also two conductive leads 66 and 68 connected to the read transducer 48 for conducting sensed electrical signals to a sense amplifier (not shown).

During the data reading mode, recording medium 62 travels in the direction 72 adjacent to the air bearing surface 74 of magnetic head 50. Information stored on the recording medium 62 is intercepted by the transducer 48 as changes of magnetic flux. These magnetic flux changes are converted by the transducer 48 into electrical signals at conductor leads 66 and 68.

Figure 6:
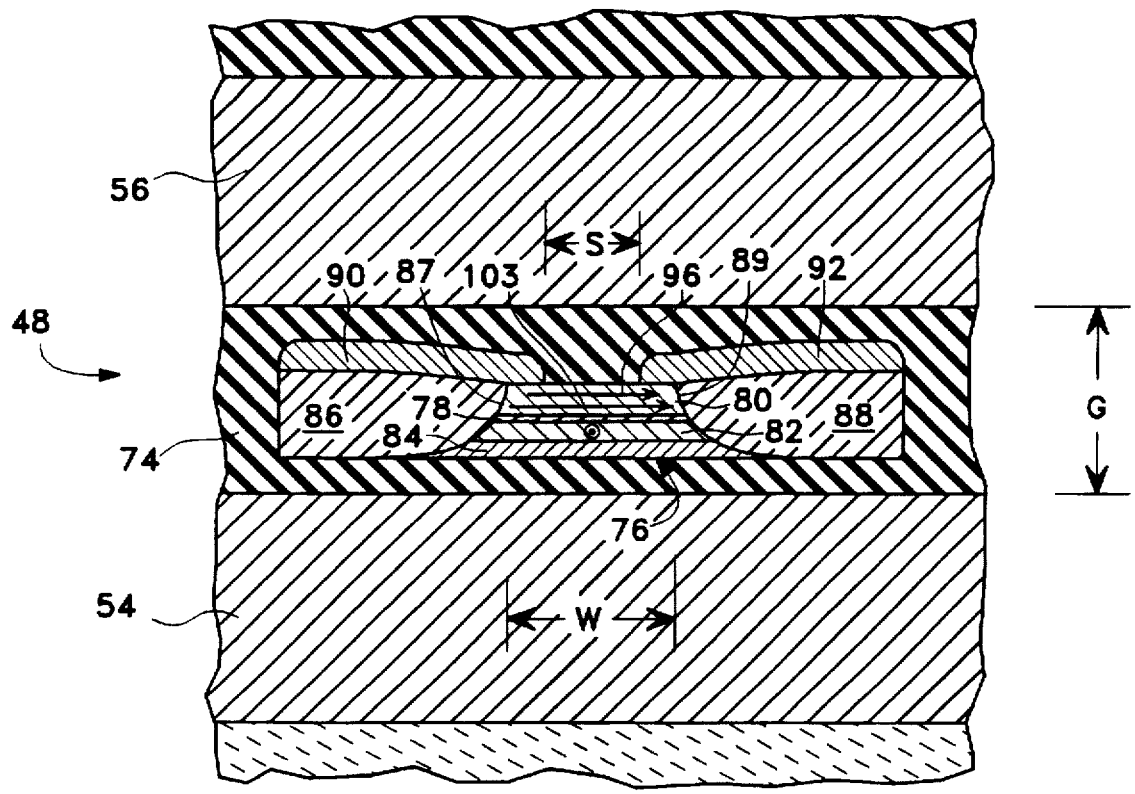
FIG. 6 is a cross-sectional partial view taken along the line 6—6 of FIG. 5.
Figure 7:
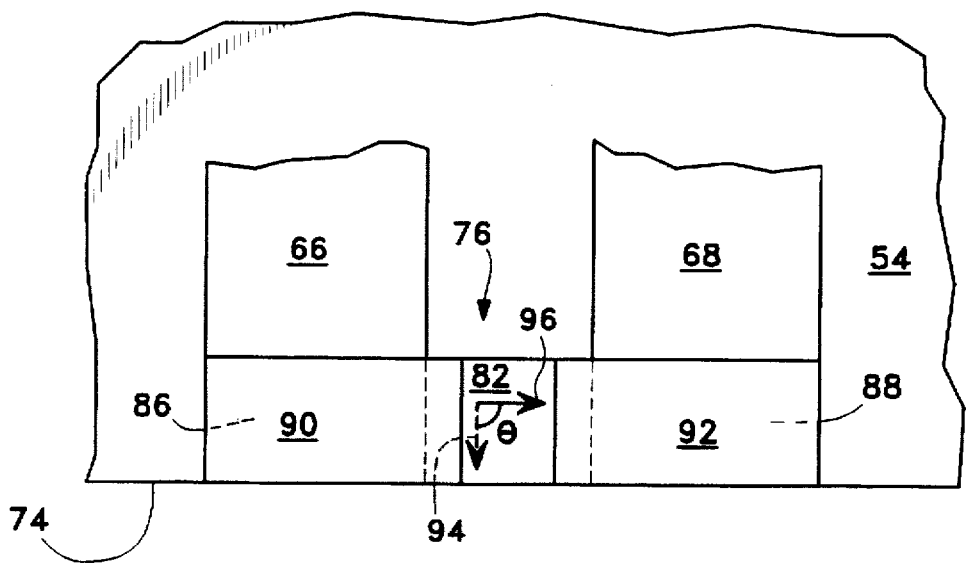
FIG. 7 is a cross-sectional partial view taken along the line 7—7 of FIG. 5.
Figure 8:
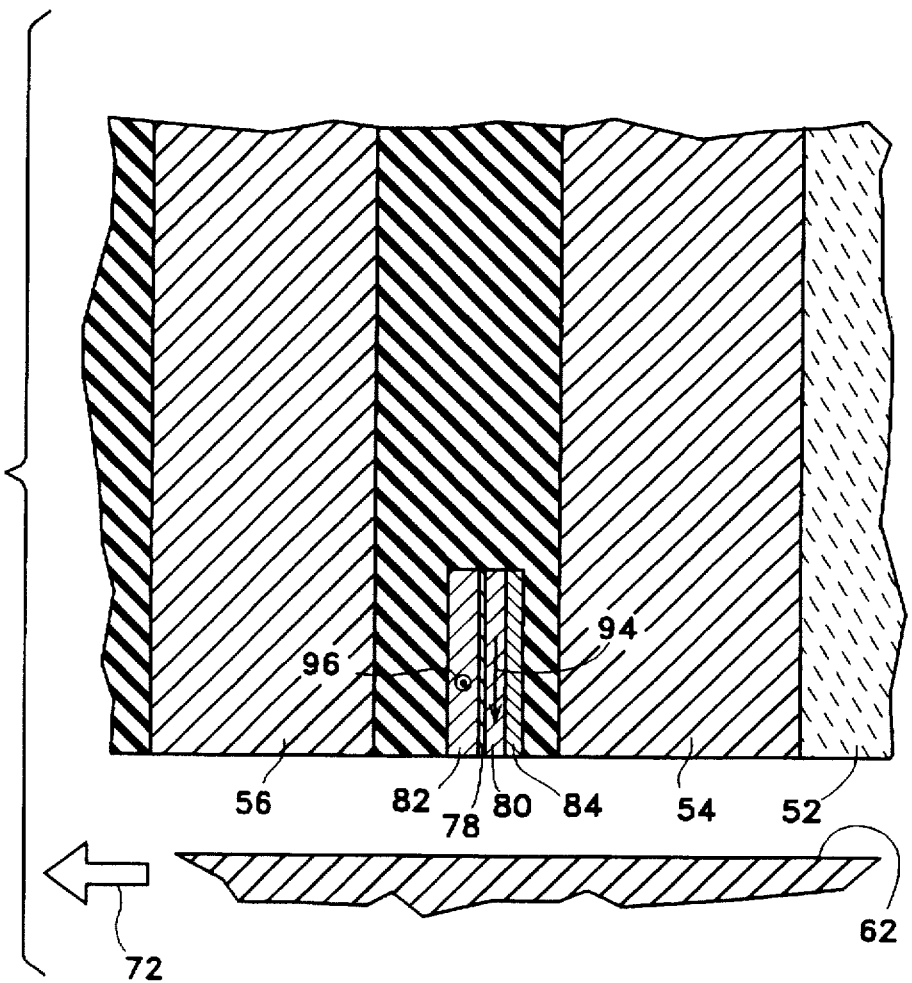
FIG. 8 is a cross-sectional partial view taken along the line 8—8 of FIG. 5.

In FIGS. 6–8, the various dielectric and protective layers are included and illustrated. Disposed between the shields 54 and 56 and separated therefrom is the read transducer 48. The material used for the insulating dielectric 74 is preferably nonmagnetic and nonconducting. In the preferred embodiment, the insulating dielectric 74 comprises alumina ($Al_2O_3$). The transducer 48 includes a multilayer structure 76 having a spacer layer 78 sandwiched between a first ferromagnetic layer 80 and a second ferromagnetic layer 82. Disposed in contact with the second ferromagnetic layer 82 is a transverse magnetic bias layer 84. Electrical lead layers 86 and 88 are positioned in abutting contact with the first ferromagnetic layer 80 via abutting junctions 87 and 89, respectively. Atop the electrical lead layers 86 and 88 are the respective first and second longitudinal magnetic bias layers 90 and 92.

Figure 6A:
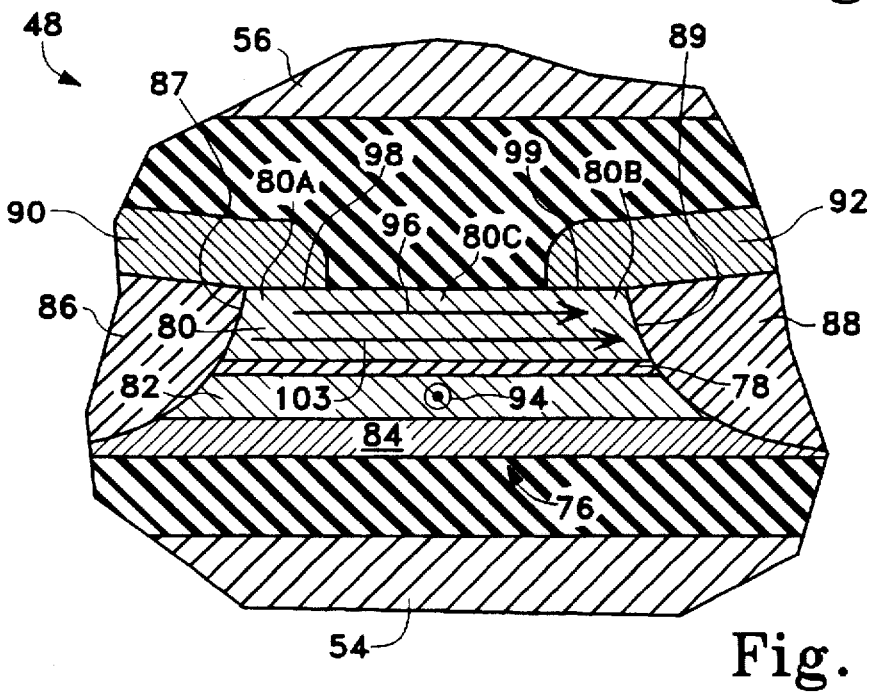
FIG. 6A is an enlarged view of a portion of the transducer shown in FIG. 6 showing the multi-layer structure in further detail.

FIG. 6A is an enlarged view of FIG. 6 revealing the multi-layer structure 76 in further detail. The first ferromagnetic layer 80 includes end portions 80A and 80B spaced by a central active portion 80C. The longitudinal magnetic bias layers 90 and 92 are in contact with the respective end portions 80A and 80B of the first ferromagnetic layer 80. The ferromagnetic layers 80 and 82 are preferably made of a soft magnetic material having a low coercive force and a high permeability. Exemplary materials for the ferromagnetic layers 80 and 82 include Permalloy (NiFe), iron cobalt (FeCo), and nickel iron cobalt (NiFeCo). In the choice of material, the coercivity of the second ferromagnetic layer 82 should be higher than that of the first ferromagnetic layer 80. This is due to the freely rotatable nature of the magnetization vector in the first ferromagnetic layer 80 in operation while the magnetization vector in the second ferromagnetic layer 82 is relatively fixed. Accordingly, the first and second ferromagnetic layers 80 and 82 are alternatively called the free and pinned layers, respectively. The spacer layer 78 is preferably a nonmagnetic and electrically conductive material such as copper (Cu), gold (Au) or silver (Ag). In the preferred embodiment, the longitudinal magnetic bias layers 90 and 92 are formed of an insulating antiferromagnetic (AFM) material.

Suitable materials for the first and second magnetic bias layers 90 and 92, and the transverse magnetic bias layer 84 include nickel oxide (NiO), cobalt oxide (CoO), nickel cobalt oxide (NiCoO), or ferric oxide ($Fe_2O_3$). It should be noted that different grades of AFM material may have to be used such that the transverse magnetic bias layer 84 has a higher blocking temperature than the corresponding temperature for the longitudinal bias layers 90 and 92. This is mainly to facilitate the fabrication process such that the magnetization state of the former in conjunction with the second ferromagnetic layer 82 would be minimally disturbed while the magnetization of the latter layers in conjunction with the first ferromagnetic layer 80 are set. As shown in FIG. 6A, the transverse magnetic bias layer 84 is initially magnetized in a direction (pointing out of the drawing figure) represented by the reference numeral 94. On the other hand, the longitudinal magnetic bias layers 90 and 92 are initially magnetized in a direction 96. Magnetization directions 94 and 96 together play a very important role in the operation of the transducer 48.

The magnetization direction of first ferromagnetic layer 80, exchange coupled by the first and second magnetic bias layers 90 and 92, is oriented in the longitudinal direction 96 as mentioned above. With the second ferromagnetic layer 82 in contact with the transverse magnetic bias layer 84, the magnetization of the second ferromagnetic layer 82, with a higher coercivity, is also fixedly pinned in the direction 94 through the process of exchange coupling. Since the two ferromagnetic layers 80 and 82 are separated by the spacer layer 78 which is electrically conducting, electrons in the second ferromagnetic layer 82 spinning under the pinned magnetization direction 94 can freely migrate to the first ferromagnetic layer 80 and assert influence. Accordingly, the thickness of the spacer layer 78 is very significant in the design of the transducer 48. The thickness of the spacer layer 78 should be thick enough to prevent any exchange coupling between the pinned layer 82 and the free layer 80, and yet thin enough to allow conduction electrons to traverse though. That is, the thickness of the spacer layer 78 needs to be smaller than the mean free path of the conduction electrons from the pinned layer 82 to the transverse path into the free layer 80. It has been found that the resistivity change in the first ferromagnetic layer 80 is linearly proportional to the cosine of the angle θ (FIG. 7) formed by the two magnetization directions 94 and 96. At quiescent state, the angle θ assumes the value of 90° which positions the transducer 48 in the middle of the linear operational portion.

Figure 4:
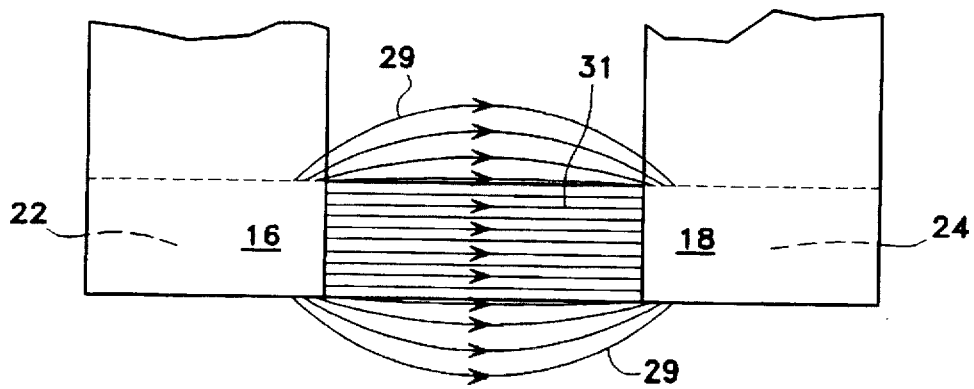
FIG. 4 is a top elevational view of the prior art transducers shown in FIGS. 1-3 illustrating the fringing effect of the bias field caused by the longitudinal magnetic bias layers.

To maintain the free layer 80 in a single domain state, the first and second magnetic bias layers 90 and 92 provide the longitudinal bias 96 to the layer 80. Maintaining a single domain state in the free layer 80 avoids the occurrence of constant merging and splitting of multiple magnetic domains which are the main source of Barkhausen noise. As mentioned before, the material for the first and second longitudinal bias layers 90 and 92 are formed of insulating AFM material which provide many advantages when used in the transducer 48. First, the insulating AFM material is oxide based and is therefore highly resistant to corrosion. This benefit allows that during the fabrication of the transducer 48, the various steps of oxide stripping or cleaning are eliminated which would otherwise be required. Secondly, because the layers 90 and 92 are insulating, no bias current can be shunted away from the lead layers 86 and 88 with resultant Ohmic loss and Joule heat. Since there is no net magnetic moment in an AFM material, there is no fringing field such as stray field lines 98 as shown in FIG. 4, of a conventional transducer in which hard magnetic material such as an alloy of cobalt, chromium and platinum (CoCrPt) is used. With no stray flux, the transducer 48 of the invention is more sensitive during data reading, especially in applications involving media having high linear recording density.

Figure 1:
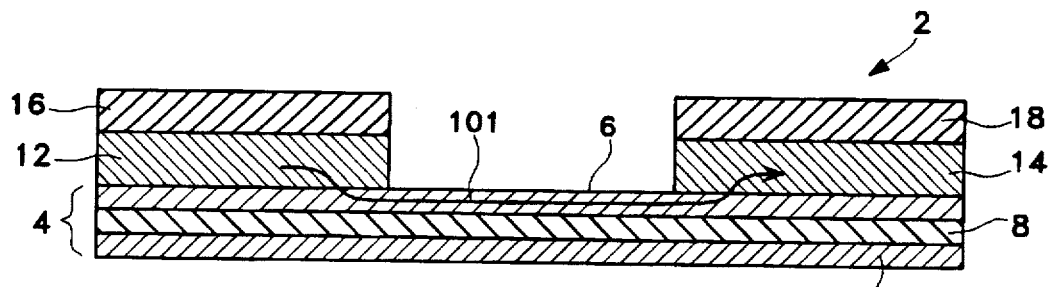
FIGS. 1-3 are cross-sectional views of various prior art magnetoresistive transducers taken along planes parallel to the air bearing surfaces of the transducers.

It also should be noted that the longitudinal magnetic bias in the transducer 48 is highly continuous. Since the longitudinal bias layer 90 and 92 are formed of AFM material, the longitudinal magnetic bias 96 originates from a first junction interface 98 between the first bias layer 90 and the first end portion 80A of the ferromagnetic layer 80 to the second junction interface 99 between the second bias layer 92 and the second end portion 80B of the ferromagnetic layer 80. The longitudinal magnetic bias path 96 is substantially one-dimensional. Phrased differently, there is no directional bending of the longitudinal bias path 96 in the first magnetic layer 80, in contrast with some of the prior art transducers, such as the transducer 2 shown in FIG. 1 in which the longitudinal magnetic bias direction is denoted by the reference numeral 101. In the transducer 2, the longitudinal bias originates from the body of the first hard bias layer 12 to the corresponding body of the second hard bias layer 14. With a meandering bias path 101, the ferromagnetic layer 6 is more susceptible to sustain a multiple-domain state.

Figure 2:
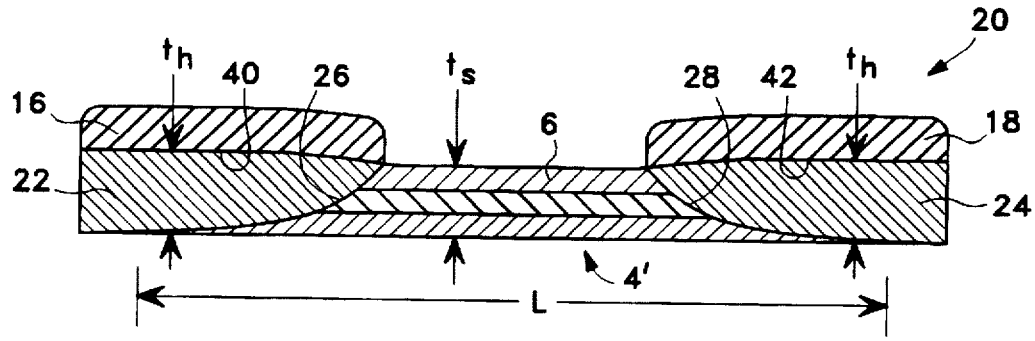
Figure 3:
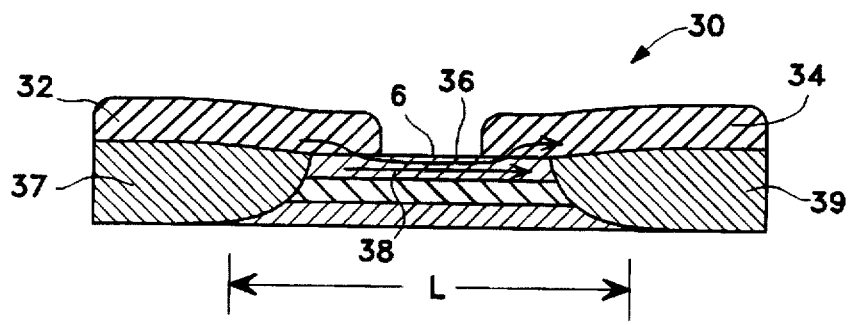

As illustrated in FIG. 6A, the transducer 48 of the invention also assumes a direct bias current path 103. The overall resistance of the current path 103 is substantially lower in comparison with most conventional transducers. First, there are only two junction interfaces 87 and 89 instead of four, as explained previously, in the transducer 2 (FIG. 1) and the transducer 4 (FIG. 2), for the bias current to pass through. Accordingly, conductivity and reliability are both improved. Secondly, the material for the lead layers 86 and 88, preferably made of Cu, Ag or Au, instead of CoCrPt as in the transducers 2 and 20, are highly electrically conductive. The problem of excessive Joule heat generated in confined spaces is therefore substantially alleviated. This attribute is important to the performance and reliability of an MR transducer.

The fabrication of the transducer 48 involves conventional thin film processing steps and are not elaborated herein. In the preferred embodiment, the shield-to-shield gap length G (FIG. 6) is approximately 0.18 μm. The lead-to-lead separation W (FIG. 6) is about 2.5 μm. The separation S of the first and second magnetic bias layers 90 and 92 is about 1.5 Åm. The first ferromagnetic layer 80, the second ferromagnetic layer 82, the spacer layer 78 and the transverse magnetic bias layer 84 can be deposited to the respectively thickness ranges of approximately, 50–75Å, 25–50Å, 14–40Å, and 100–300 Å.

Figure 9:
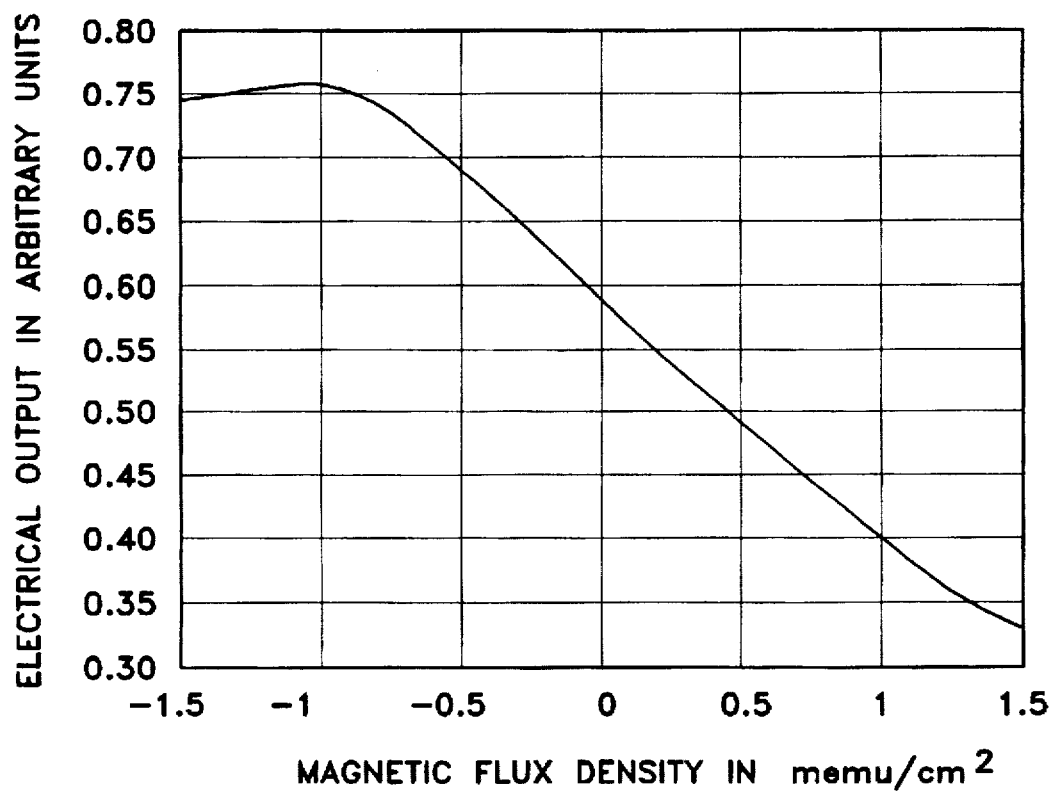
FIG. 9 is a graphical representation showing the relationship of the sensed electrical output with respect to the magnetization strength of the recording medium by the transducer shown in FIGS. 5-7.
Figure 10:
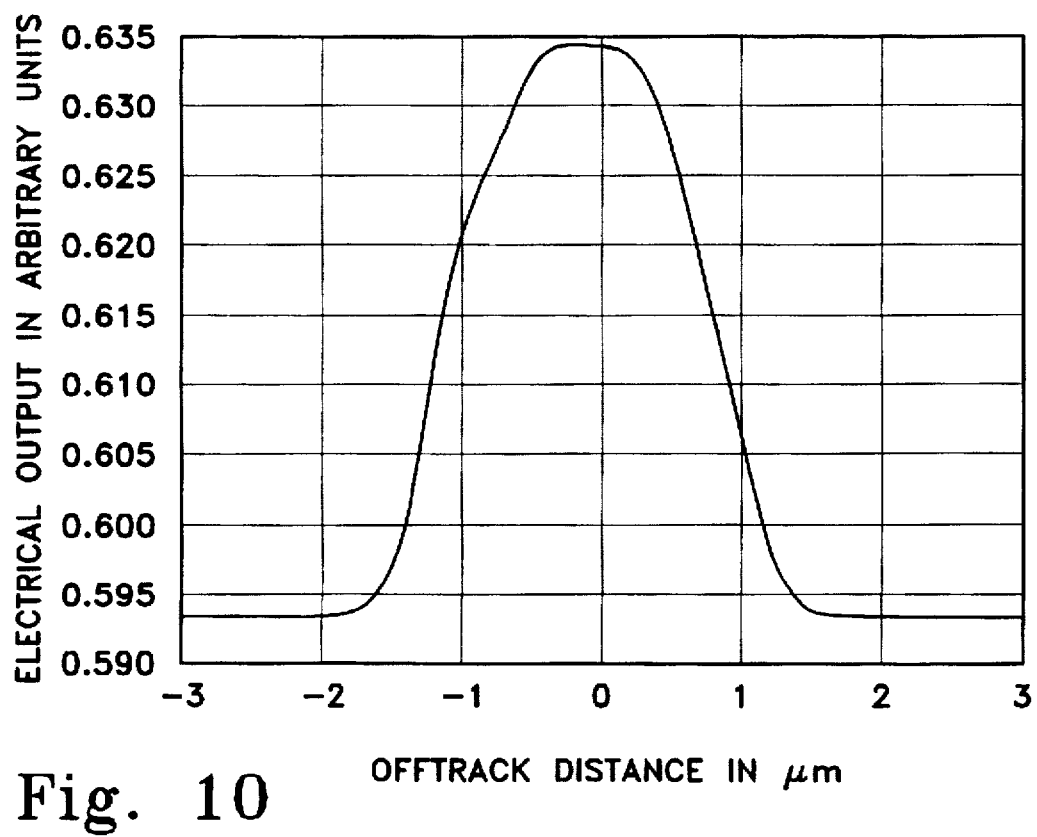
FIG. 10 is a graphical representation of the result of a typical data track profile measurement performed by the transducer shown in FIGS. 5-7.

The modeled spin valve head performance is summarized and charted on graphs as shown in FIGS. 9 and 10. FIG. 9 is a graphical representation of the electrical output generated by the transducer 48 as a function of flux strength emanating from the recording medium. As shown in FIG. 9, a substantially linear region can be obtained within the range of +1 menu/cm$^2$ to −1 menu/cm$^2$ (magnetic flux per square centimeter). FIG. 10 is a typical profile measurement of a data track on the magnetic disk by the transducer 48. There are neither side lobes nor discontinuities in the electrical output curve. This is a strong indication that the active layer 6 is properly biased by the longitudinal layers 90 and 92 with no multiple domain formation.

Figure 11:
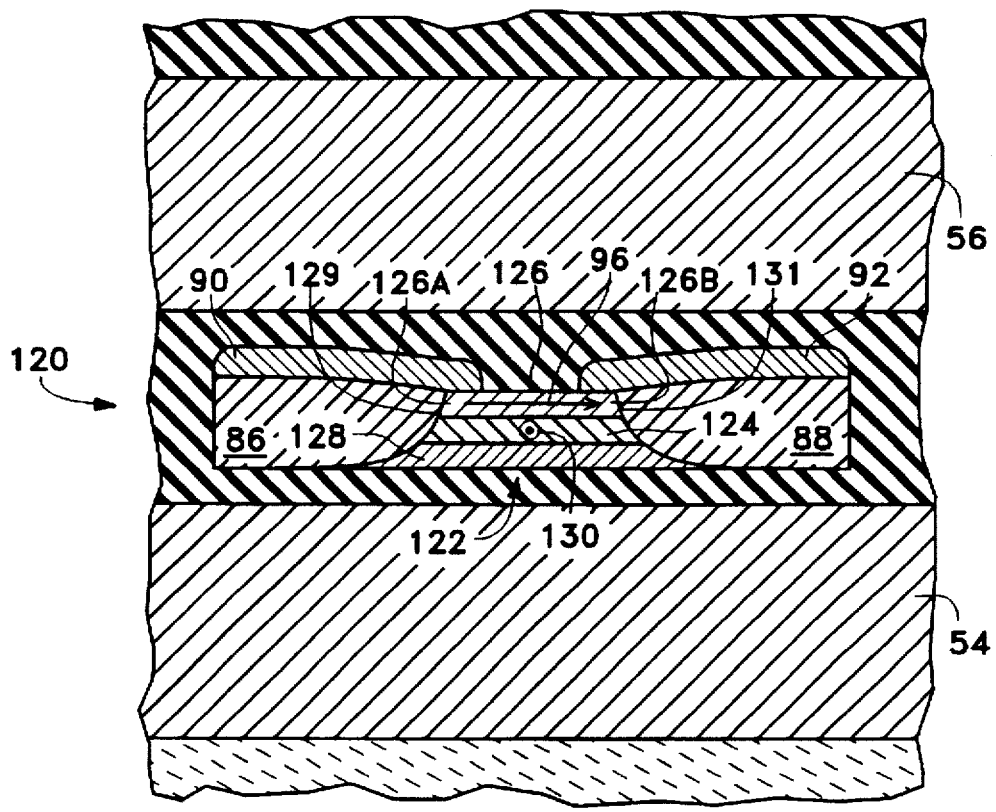
FIG. 11 is a cross-sectional view, in part, of another embodiment of the transducer of the invention taken along a plane parallel to the air bearing surface of the transducer.
Figure 12:
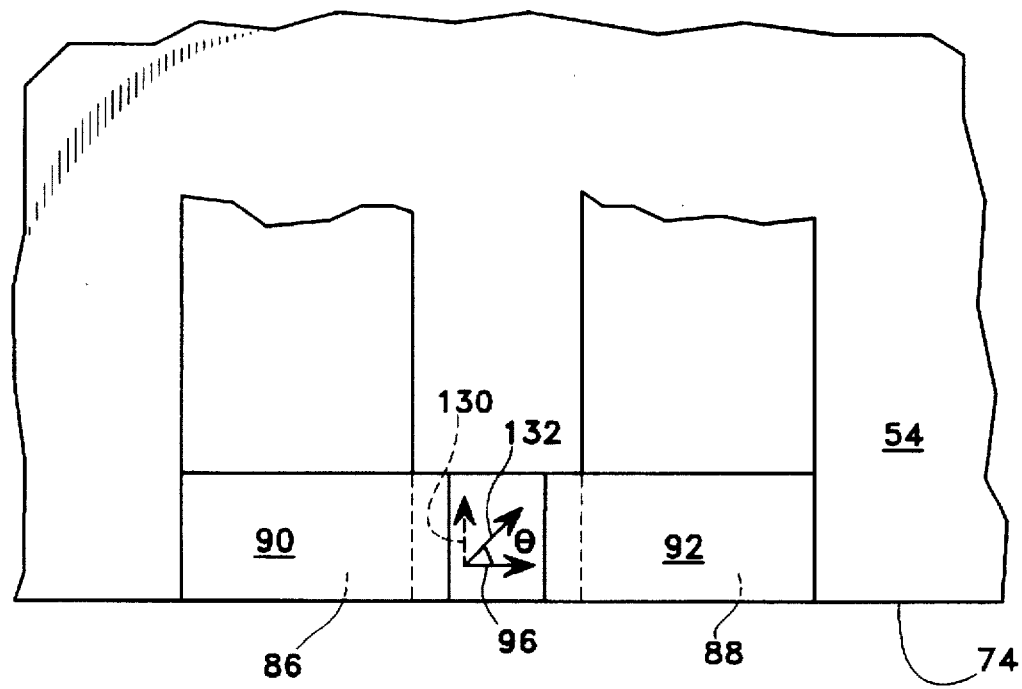
FIG. 12 is a top elevational partial view of the transducer shown in FIG. 10.

FIGS. 11 and 12 depict a second embodiment of the invention. Shown in FIGS. 11 and 12 are respectively the cross-sectional view parallel the to ABS and the top plan view of an AMR transducer 120 which includes a trilayer structure 122 having a spacer layer 124 sandwiched between a ferromagnetic layer 126 and a soft adjacent layer 128. The electrical leads 86 and 88 form abutting contacts with the end portions 126A and 126B of the ferromagnetic layer 126 through the respective abutting junctions 129 and 131. Disposed atop the electrical leads 86 and 88 are the respective first and second longitudinal magnetic bias layers 90 and 92 which provide a longitudinal bias in the direction 96. The soft magnetic layer, having a coercivity higher than ferromagnetic layer 126, provides a transverse magnetic bias in the direction 130. As a consequence, a resultant magnetization vector 132 is formed at the ferromagnetic layer 126. During the quiescent state, the magnetization vector 132 forms an angle θ with respect to the longitudinal direction 96. The resistivity of the ferromagnetic layer 126 is proportional to the square of the cosine of the angle θ. The operational detail and other aspects of an AMR transducer can be found in the referenced U.S. Pat. No. 5,438,470.

Finally, other variations are possible within the scope of the invention. For example, the longitudinal bias layers 90 and 92 need not be made of AFM material. Other materials can be used instead. For example, hard magnetic material such as CoCrPt or alloy of cobalt, chromium and platinum (CoCrTaPt) can be used as substitutes. Even if AFM material is used for the longitudinal bias layers 90 and 92, the selected AFM material need not be insulating. Conductive AFM materials, such as iron manganese (FeMn), iron manganese rhodium (FeMnRh), manganese platinum (MnPt), and manganese iridium platinum (MnIrPt), can be used as substitutes. The resultant transducer may not be as desirable in performance but nevertheless a fully functional transducer. These and other changes in form and detail may be made therein without departing from the scope and spirit of the invention.

What is claimed is:

1. A spin valve giant magnetoresistive transducer for cooperation with a magnetic medium on which data tracks are recorded comprising:

a ferromagnetic layer including end portions spaced by a central active portion;

first and second electrical lead layers formed of electrically conductive material and disposed respectively in laterally abutting contact with said end portions of said ferromagnetic layer; and first and second longitudinal magnetic bias layers, disposed above said electrical lead layers respectively and in contact with said end portions of said ferromagnetic layer for providing a magnetic bias to said ferromagnetic layer and for defining the track width of said data tracks.

2. The magnetoresistive transducer as set forth in claim 1 wherein said first and second magnetic bias layers are disposed respectively in contact with said first and second electrical lead layers.

3. The magnetoresistive transducer as set forth in claim 1 wherein said magnetic bias layers provide longitudinal magnetic bias, and wherein said transducer comprises a third magnetic bias layer disposed parallel to and separated from said ferromagnetic layer by a spacer layer, said third magnetic bias layer providing a transverse magnetic bias to said ferromagnetic layer.

4. The magnetoresistive transducer as set forth in claim 3 wherein said third magnetic bias layer comprises antiferromagnetic material and is substantially electrically non-conductive.

5. The magnetoresistive transducer as set forth in claim 4 wherein said antiferromagnetic material is made of a material selected from a group consisting of nickel oxide, cobalt oxide, nickel cobalt oxide, and ferric oxide.

6. The magnetoresistive transducer as set forth in claim 1 wherein said ferromagnetic layer is a first ferromagnetic layer, said transducer including a second ferromagnetic layer, and a spacer layer for separating said first and second ferromagnetic layers.

7. The magnetoresistive transducer as set forth in claim 6 wherein said magnetic bias provided to said ferromagnetic layer is a longitudinal bias, said transducer including a third magnetic bias layer disposed in contact with said second ferromagnetic layer, said third magnetic layer providing a pinning magnetic bias to said second ferromagnetic layer.

8. The magnetoresistive transducer as set forth in claim 7 wherein said magnetic bias layers are formed of antiferromagnetic material.

9. The magnetoresistive transducer as set forth in claim 8 wherein said antiferromagnetic material is substantially electrically nonconductive.

10. A magnetoresistive spin valve giant transducer for converting changes in magnetic flux registered on a magnetic medium to electrical signals comprising:

a ferromagnetic structure including end portions spaced by a central active portion, said ferromagnetic structure varying in electrical resistivity in response to changes in magnetic flux;

first and second electrical lead layers formed of electrically conductive material, and disposed respectively in laterally abutting contact with said end portions of said ferromagnetic structure; and first and second longitudinal magnetic bias layers disposed respectively in contact with said end portions of said ferromagnetic structure and with said electrical lead layers for providing a longitudinal magnetic bias to said ferromagnetic structure;

wherein when an electrical current passes through said ferromagnetic structure via said electrical lead layers, said ferromagnetic structure varies in resistivity in response to changes in magnetic flux sensed by said transducer, and a varying voltage is correspondingly generated at said ferromagnetic structure, said varying voltage representing the electrical signals converted by said transducer from the changes in magnetic flux.

11. The magnetoresistive transducer as set forth in claim 10 wherein said ferromagnetic structure comprises a first ferromagnetic layer, a second ferromagnetic layer, and a spacer layer for separating said first and second ferromagnetic layers.

12. The magnetoresistive transducer as set forth in claim 11, including a third magnetic bias layer disposed in contact with said second ferromagnetic layer, said third magnetic layer providing a pinning magnetic bias to said second ferromagnetic layer, said first, second and third magnetic bias layers being formed of antiferromagnetic material which is substantially electrically nonconductive.

13. The magnetoresistive transducer as set forth in claim 12 wherein said antiferromagnetic material is made of a material selected from a group consisting of nickel oxide, cobalt oxide, nickel cobalt oxide, and ferric oxide.

14. The magnetoresistive transducer as set forth in claim 11 wherein said electrical lead layers and said spacer layer are made of a material selected from a group consisting of copper, gold and silver.

15. The magnetoresistive transducer as set forth in claim 11 wherein said spacer layer comprises tantalum.

16. A spin valve giant magnetoresistive transducer comprising:

first and second layers of ferromagnetic material, each of said layers of ferromagnetic material having end portions spaced by an active region;

a spacer layer of nonmagnetic material disposed between said first and second layers of ferromagnetic material;

first and second electrical lead layers formed of electrically conductive material, said electrical lead layers being disposed respectively in laterally abutting contact with said end portions of said layers of ferromagnetic material;

first and second longitudinal magnetic bias layers, said longitudinal magnetic bias layers being disposed above said electrical lead layers respectively and in contact with the end portions of said first layer of ferromagnetic material, for providing a longitudinal magnetic bias to said first ferromagnetic layer; and a third magnetic bias layer disposed in contact with said second layer of ferromagnetic material, said third magnetic bias layer providing a pinning bias to said second layer of ferromagnetic material.

17. A spin valve giant magnetoresistive transducer as in claim 16, wherein said first ferromagnetic layer is about 50–75 Å thick, said second ferromagnetic layer is about 25–50 Å thick, said spacer layer is about 14–40 Å thick and said third magnetic bias layer is about 100–300 Å thick.

* * * * *